Oct. 26, 1937.  J. R. JOHNSON  2,096,967
AIR CONDITIONING
Filed Oct. 16, 1935   2 Sheets-Sheet 1

INVENTOR
JOHN R. JOHNSON
BY William P. Feyrer
ATTORNEY

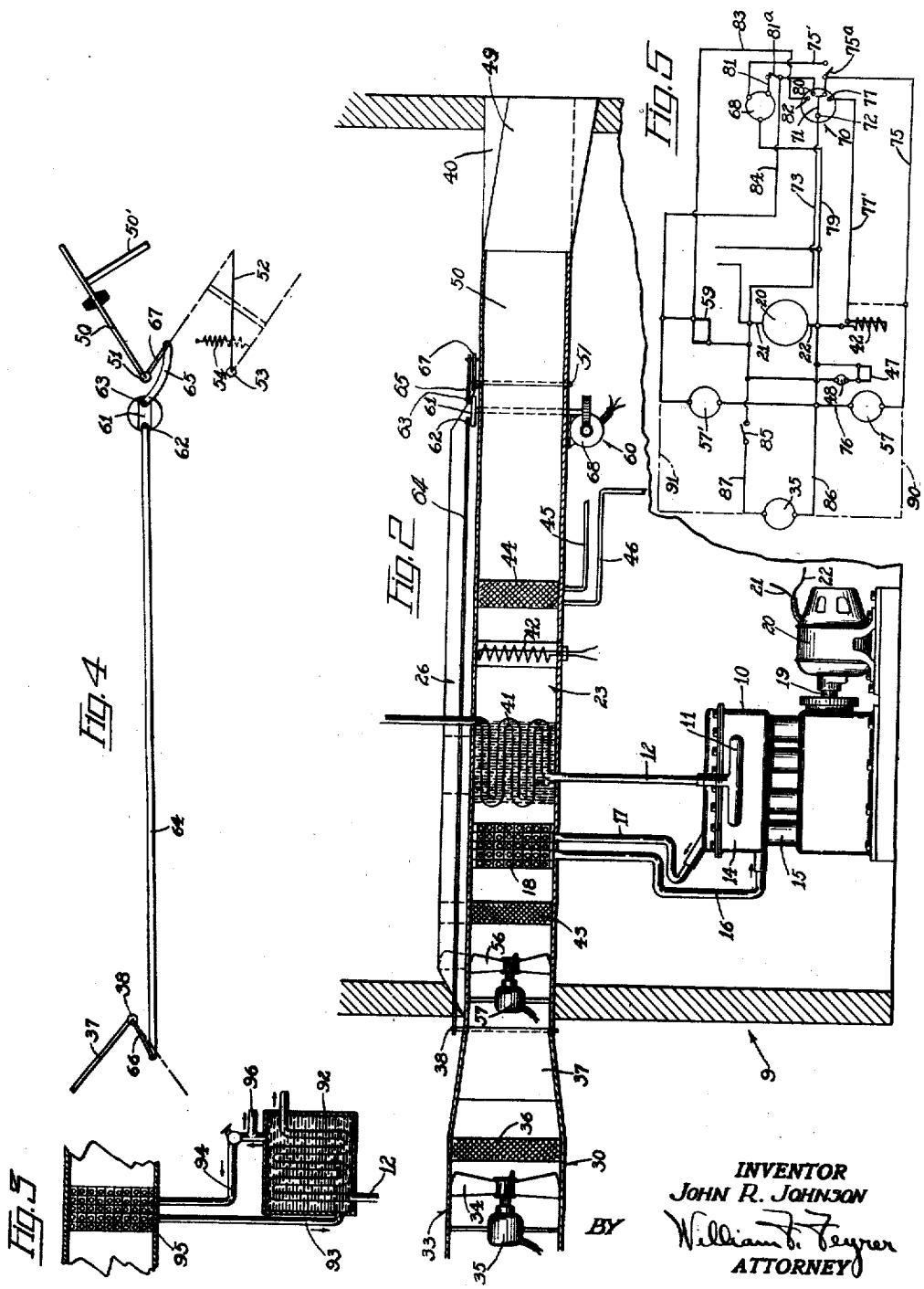

Patented Oct. 26, 1937

2,096,967

UNITED STATES PATENT OFFICE 2,096,967

AIR CONDITIONING

John R. Johnson, New Canaan, Conn.

Application October 16, 1935, Serial No. 45,209

14 Claims. (Cl. 257—3)

This invention relates to new and useful systems and apparatus for conditioning and distributing air.

There are many systems, and many different types of apparatus for use in each of these systems, for heating homes, offices, factories, and divers other places. In general, most of these are of low efficiency, inconvenient, and uncleanly. The inefficiency of home heating is so well known that description thereof is unnecessary.

Suffice in the present instance to state that in practically all small heating systems commonly used, especially in homes, the system serves only one purpose—that of heating the home in winter-time. In addition the home owner has to purchase electrical power from a municipal or independent company for use in house lighting and the operation of electrical specialties, and in addition also has to pay separately for a gas heater for domestic hot water. It is thought that in none of these previous systems was there any provision for cooling the room as well as heating it, or of any single apparatus capable of performing all of these different functions.

It is realized that there have been a few previous efforts to utilize waste steam from a power plant to heat a factory. However, practically all of these efforts were in the nature of a series of pipes merely conducting the waste steam to suitably located radiators.

Also, there have been recent developments in the field of air conditioning whereby places may be cooled and/or humidified. However, practically all the systems for these latter purposes have been separate units and while admittedly providing many advantages toward making a room more comfortable, the cost of operation is prohibitive in nearly all instances, or at least is so prohibitive that there can be no general adoption thereof.

It is an object of the present invention to provide a useful and highly efficient system and apparatus for conditioning and distributing air in homes, offices, factories, and the like.

Broadly, the present invention contemplates the provision of a single system and apparatus adopted to: (1) heat air; (2) cool air; (3) filter and/or humidify air; (4) selectively distribute heated and cooled air; (5) generate electrical power; (6) closely control the temperature and the humidity of interrelated heated and cooled air; (7) accomplish all these desirable factors from only one source of power and largely through incidental heat and the utilization of waste products of combustion from the one source of power.

Some of the novel features resulting from the accomplishment of this object and complemental aims are as follows: the provision of a hot air heating system including a duct for directing the heated air to suitable locations and the duct itself serving as a heating chamber wherein waste heat from the water jacket and from the exhaust of an internal combustion engine may be used, and/or housing an electrical resistance, deriving its power from a generator operated by the internal combustion engine and primary source of power.

A supplemental feature includes the provision of a filter and/or humidifying device in the hot air duct adapted to control the extent of humidity in the heated air being conducted to the desired place of use.

Another supplemental feature is the provision of a gate and by-pass adapted to deflect heated air from the building and apparatus either to a chimney or to the atmosphere outside the building, and to do this automatically, when temperatures within the building reach a predetermined point.

Another very important feature of the present invention is the provision of a duct adapted to receive unconditioned air, to cool the air, to direct it to the building, and, if desired, to humidify the air, all of which can be acomplished in the air conducting duct. This novel apparatus in its preferred form includes means for automatically cooling the air in the duct when the room temperature goes beyond a high point, for automatically causing air to flow through the duct and for controlling a gate between the cooling duct and the building.

In the most highly developed form of the present invention an important feature is the provision of a system and apparatus adapted to automatically and concurrently heat and cool air and to automatically and alternatively conduct the passage of the heated and cooled air to maintain a room or building temperature within certain predetermined degrees.

In the drawings:

Fig. 2 is a side view of the apparatus shown in Fig. 1.

Fig. 3 is a fragmentary view of a modified form of exhaust gas water heater.

Fig. 4 is a schematic view of the gate control.

Fig. 5 is a wiring diagram.

Figure 1:
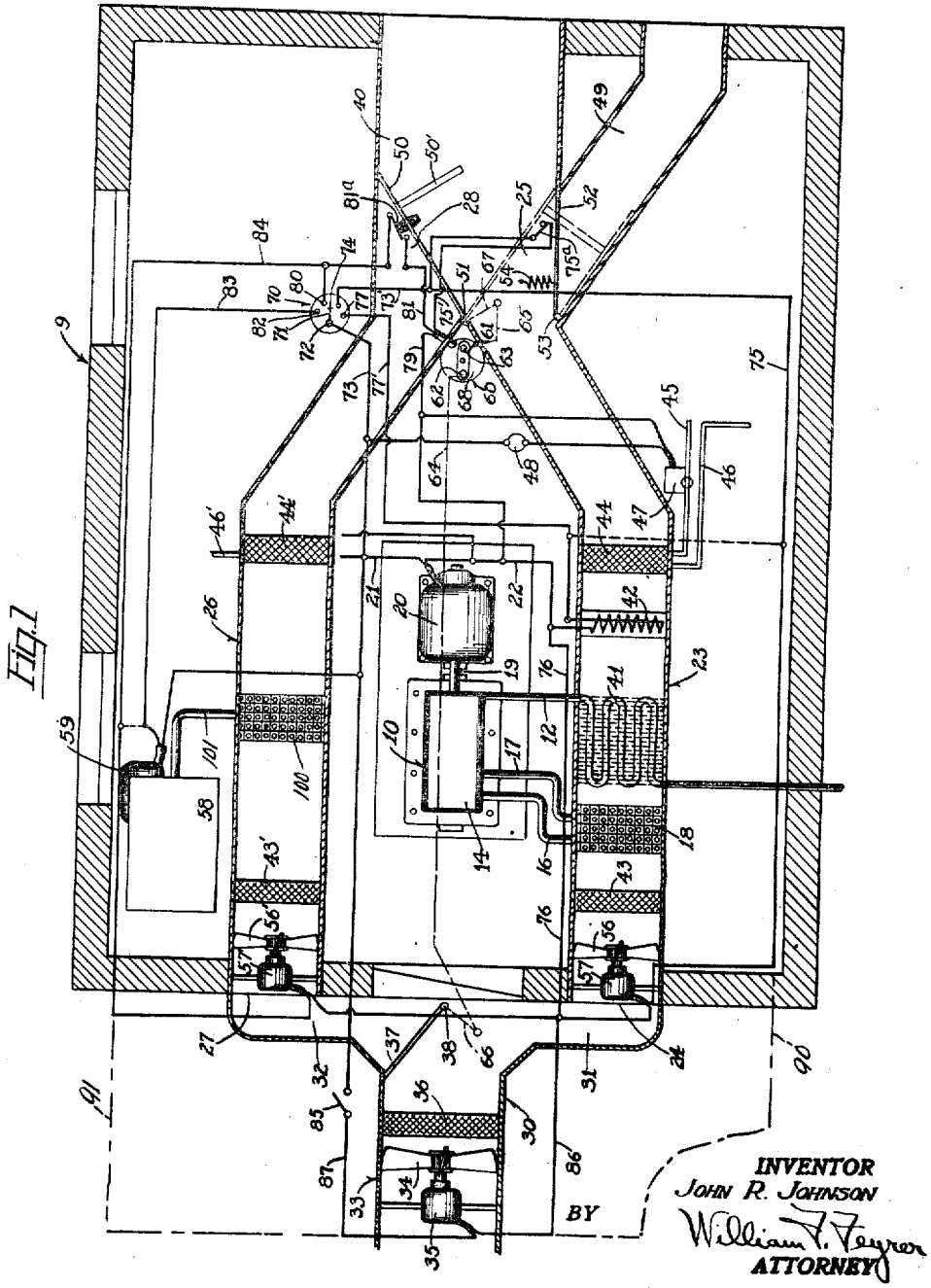
Figure 1 is a top plan view of the complete system and apparatus for conditioning and distributing air, and of generating power, provided by the present invention.

The detailed description which follows is under various headings to facilitate an understanding of the various mechanisms and their mode of operation. The present invention is not limited to the details of construction and arrangement of parts illustrated and described herein, for the invention is capable of other embodiments in whole or part, and the phraseology used is for the purpose of description and not of limitation.

Referring now in detail to the drawings, which show the present preferred embodiment of the invention, there is shown an internal combustion engine 10 which may be of any conventional type having an exhaust manifold 11 and an exhaust pipe 12, and also having a water jacket 14 surrounding cylinders 15 with an associated water inlet pipe 16 and outlet pipe 17 extending to a radiator 18. The latter are so arranged that the cold water enters the water jacket at the bottom thereof and the heated water rises and leaves the jacket at the top thereof. The internal combustion engine may, within the purview of this invention, be a gasoline, Diesel, crude oil, or other type.

As may be seen best in Figs. 1 and 2, the internal combustion engine 10, through a shaft 19, is adapted to operate a generator 20, preferably of conventional 110 voltage, for distribution of electricity through feed wires 21 and 22 for lighting and divers other uses.

Hot air apparatus

Now, of particular importance, the present invention provides a hot air duct 23, which may be of sheet metal or any other conventional form, having an inlet port 24 and an outlet port 25, and a somewhat similar cold air duct 26 having an inlet port 27 and an outlet port 28.

The inlet ports 24 and 27 may communicate with the atmosphere outside of a building, with air in the room that a main apparatus 9 is located in, or any other location. However, they preferably communicate with a common inlet chamber 30 having shunt ducts 31 and 32 communicating with the inlet ports 24 and 27 respectively and having a main entrance duct 33. Preferably, a fan 34 driven by a motor 35 is located in the main entrance duct 33 to draw air from any suitable location and force it inwardly of the duct. Also, any suitable filter pad 36 may be located in the duct.

A gate 37 on a pivot 38 is provided to deflect air from the main entrance chamber 33 to the shunt duct 31, entrance port 24, and hot air duct 23, as shown in Fig. 1, or to be moved counter-clockwise from the position shown there into a position where it will deflect the air from the main entrance chamber 33 to the shunt duct 32, inlet port 27 and cold air duct 26. The use of this main entrance unit 30 is not absolutely essential, but is very advantageous, as will be pointed out hereinafter.

One of the outstanding advantages of the present invention is the uniform control of air temperature in a room, building, or the like, and economies effected by its use. To this end the present invention provides a radiator 18, in communication with the water jacket 14, directly in the hot air duct 23 to heat the air passing from the port 24 inwardly of the duct. This radiator may be of any conventional type, but is preferably one with tubes and grills adapted to allow the air to pass therebetween. This radiator in itself is capable of warming or heating a considerable volume of air which may in turn be passed from the outlet port 25 into a main outlet duct 40 for distribution to any desired location.

However, in order to heat the air to a higher degree of temperature and in order to be able to heat a greater volume of air, a second heating unit 41 comprising a coiled pipe connected with the exhaust pipe 12 of the internal combustion engine 10 is also located within the hot air duct 23. Even if this unit was never heated to the same degree as the radiator 18, it would make possible the heating of a larger volume of air. However, in view of the fact that the exhaust gases are much hotter than the water in the water jacket 14 and radiator 18, it is possible to greatly step up the degree of heat imparted to the air passing inwardly through the duct 23.

In addition, too, the present invention provides an electrical resistance heating unit 42 within the hot air duct 23, preferably deriving its power from the generator 20, to supplement the heating accomplished by the radiator 18 and heating unit 41 on especially cold winter nights or at other times when a higher degree of heat is desired.

If preferred, a filter 43 and a humidifier 44 may be placed within the hot air duct 23 at any suitable point therein. The humidifier 44 may be connected to an inlet water pipe 45 and suitable outlet pipe 46. Water passage from the inlet pipe to the humidifier may be controlled by any usual manually operated valve but is preferably, and as shown in Figs. 1 and 5 particularly, operated by an automatic valve 47 controlled by a humidistat 48.

The heated air may be passed through the outlet port 25 to the outlet chamber 40 for distribution at a point of use; or, when the heat becomes excessive or high, it may be deflected through a by-pass duct 49, either into a chimney or released to the atmosphere outside the home, factory, or the like. This deflection is accomplished by moving a gate 50, on a pivot 51, from the outlet port 28 and full line position shown in Fig. 1, to the outlet port 25 and dot and dash line position, whereupon a bar 50' engages a secondary gate 52 to move it about its pivot 53 against the tension of a spring 54 into the dot and dash position. Normally, the gate 50 closes the outlet port 28 of the cold air duct 26, thus allowing the outlet port 25 to remain open, and allowing the spring 54 to pull the gate 52 into position to close the by-pass duct 49.

The hot air duct may also be provided with a fan 56 having a motor 57 adapted to draw air from the inlet port 24 and force it inwardly through the hot air duct 23. Such fan and motor are preferably provided when the main entrance chamber 30 and associated fan 34 and motor 35 are not provided.

Cold air apparatus

The cold air duct 26 is similar in many respects to the hot air duct 23 just described in detail. It may be of conventional sheet metal or like construction. Although its main function may be to direct normal unheated air from a point, for example exterior of a building housing the main apparatus 9 of the present invention, through the inlet port 27 and thence through the outlet port 28 and main outlet chamber 40 to a point of use, it also, as shown, is used for cooling and otherwise conditioning the air. To this latter end, the present invention provides a cooling coil 100, directly within the duct 26, which may be operated by any of the well known refrigerants and which is preferably connected through a pipe 101 with a compressor unit 58, operated by a motor 59. This motor preferably receives power from the generator 20. The cold air duct 26 may also be provided with a filter 43' and with a de-humidifier 44', of any usual and well known type, the latter having an outlet pipe 46'.

Dual control

An unusual and advantageous feature of the present invention is the provision of a very efficient mechanism adapted to coordinately control both the hot air duct 23 and cold air duct 26. The mechanism for this purpose includes a motorized control unit 60 having a control plate 61 with pins 62 and 63 connected to links 64 and 65 respectively which are in turn connected to arms 66 and 67, extensions of the gates 37 and 50 respectively. The control plate 61 is operated by a motor 68 which is of usual reversible type. At the maximum point of its counter-clockwise rotation, as viewed in Figs. 1 and 4, the control plate, through the link 64 and arm 66 closes the gate 37 and thereby prevents air passing from the main entrance duct 33 through the shunt duct 32 and inlet port 27, and also closes the outlet port 28 with the gate 50 to absolutely prevent any passage of cold air from the cold air duct 26 to the main outlet duct 40.

At the maximum point of its clockwise rotation the control plate 61 through the link 64 and arm 66 moves the gate 37 in a counter-clockwise direction to close the passage from the main entrance duct 33 to the shunt duct 31 and inlet port 24, and also moves the gate 50 in a clockwise direction until it closes the outlet port 25 and simultaneously opens the gate 52 so that any heated air in the vicinity of the outlet port 25 will pass through the by-pass duct 49.

Thermostat control

Although it is possible to control the gates 50 and 52, and/or 37 with a hand lever on the link 64, control plate 61, or at some other convenient location in the mechanism, and to manually start the motors for fans 56 and 56', this is preferably accomplished automatically according to the present invention. To this end the present invention provides a thermostat control 70. This thermostat control includes an arm 71 movable about a pivot 72 and receiving current from the outlet wire 21 of the generator 20 through a lead 73. This thermostat 70 may be of any conventional type, and is located at any desirable point in the area being conditioned by the main apparatus 9. The arm 71 thereon is arranged to move in a clockwise direction when the temperature of the room falls below a certain point, as viewed in Figs. 1 and 5, thereby passing current from the wire 73 to a wire 75 extending to the motor 57, the current thereto being completed by another wire 76 extending to the other output wire 22 of the generator 20, thereby operating the fan 56 and driving air from the inlet port 24 through the hot air duct 23. At the same time (or upon a further drop in temperature) the arm 71 engages a contact 77 of a wire 77' to operate the electrical heating unit 42. Preferably, this arm is arranged so that it will not energize the electrical resistance unit when the fan 56 and gates 37, 50, and 52 are first operated, but is only cut in when the room temperature falls below a further predetermined degree of temperature. For example, the radiator 18 and coils 41 may be used alone to normally heat the desired location and maintain the temperature thereof between 68 and 75 degrees.

Any usual type of switches 75a and 81a may be provided in the lines 75' and 81, preferably at the outlet ports 25 and 28 respectively in order to be operated by the gate 50 and to open the circuit to the reversible motor 68 as the gate 50 reaches either of these ports.

However, if the weather is extra cold and these two units cannot maintain the room above 68 degrees, or if the room temperature drops to 66° or some other lower predetermined temperature, the arm 71 engages the contact 77 to close the circuit to the electrical resistance to further increase the extent to which air is heated in the duct until the room temperature again moves to more than 68°.

Another lead 75' extends to the motor 68, which with the other feed wires 79 causes the motor 68 to rotate in one direction, thereby moving the control plate 61 in a counter-clockwise direction, and moving the gate 50 into position to close the outlet port 28 and to open the outlet port 25, thereby permitting heated air to pass directly to the building through the outlet duct 40. At the same time the gate 52 under the influence of spring 54 moves into the position shown by solid lines in Fig. 1 so that none of the hot air can escape through the by-pass duct 49.

Conversely, when the temperature of the room is between certain limits, for example 68° to 75°, the contact arm 71 may remain out of engagement with any of the contacts shown. However, when it rises above the 75° it may close the circuit of the contact 80 and wire 81 to the motor 68, and thereby cause it to run in reverse direction and rotate the arm 61 in a clockwise direction. In this movement the control arm 61 swings the gate 50 in a clockwise direction, thereby closing the outlet port 25 and simultaneously opening the by-pass gate 52, in order to deflect the heated air coming from the hot air duct 23 out through the by-pass duct 49 and allow cool air to pass from the cold air duct 26 to the outlet chamber 40 and point of use associated therewith. Concurrently the arm 71, in its contact with the contact 80 and energizing of the line 81 may close the circuit of the fan 56' and motor 57' through a wire 84 which will drive air from the outlet port 27 inwardly of the cold air duct 26 and force it to the outlet chamber 40.

Preferably, and as shown, the arm 71 in its counter-clockwise movement (e. g. above 75°) also engages a contact 82 to pass current from the feed wire 73 through a wire 83 to the motor 59 of the compressor unit 58, thereby rendering the cooling coils 56 operative so that a usual refrigerant medium therein may cool the air in the cold air duct 26, simultaneously with or subsequent to the closing of the hot air duct 23 and opening of the cold air duct 26.

If preferred, the thermostat 70 may be arranged so that the arm 71 first closes the circuit of the motor 68 to close the hot air duct and open the cold air duct, and closes the circuit of the motor 57' to transmit cool outside air to the room, and only after a further rise in temperature (e. g. to 80°) close the circuit through the contact 82 and line 83 to the compressor 58.

Thus, the same thermostatic control 70, through the motor 68, control arm 61, and link 64 is adapted to operate the gate 37 in order to deflect the incoming air from the main entrance port 33 into either the cold air duct 26 or the hot air duct 23, concurrently with the operation of the arm 61 to operate the gates 52 and 50.

Operation

In its most highly developed and present preferred form, operation of the system and apparatus of the present invention is as follows: the internal combustion motor 10 operates substantially continuously in order to operate the generator 20 and thereby through the lines 21 and 22 provide power in the house, office, or the like at all times. When the arm 71 of the thermostat falls below 68°, it closes a circuit (as hereinbefore outlined) to the fan 56 and to the motorized control 60 in order to move the arm 61 in a counter-clockwise direction and thereby move the gate 50 into a position to close the outlet port 26 and concurrently allow the gate 52 to be closed by the spring 54, thereby closing the by-pass duct 49. Thus, the fan 56 drives air from the inlet port 24 through the radiator 18, and the heating unit 41 into the chamber 40 extending to the room or other point of use. Concurrently, or upon a lower fall of temperature, this same arm 71 cuts in the electrical resistance unit or heater 42 in order to further increase the degree of heating accomplished in the hot air duct 23. Similarly, when the room temperature goes beyond 75 or any other predetermined degree, the arm 71 closes the circuit to the fan 56' and associated motor 57' and/or to the motor 59 of the compressor unit and cooling coils 56 in order to drive air from the inlet port 27 through the outlet port 28 and outlet chamber 40 to the point of use. Simultaneously the arm 71 closes the circuit extending to the motor 68 to cause this motor to move the arm 61 in a clockwise direction, thereby opening the gate 50 relative to the outlet port 28, and closing the outlet port 25 of the hot air duct 23. At the same time, the extension 50' on the gate 50 opens the gate 52 relative to the by-pass duct 49 thereby deflecting the hot air passing through the duct 23.

As pointed out hereinbefore, the use of separate motors 57 and 57' and separate fans 56 and 56' may be dispensed with by using a single main entrance chamber 30, in which event a single fan 34 and single fan motor 35 is sufficient. In such event, the fan motor 35 may be kept running continuously by a switch 85, a line connection 86 and 87 associated with the feed wires 21 and 22, or may be cut in and cut out automatically by the thermostat 70 by extending the feed wires 75 and 84 as shown by dot and dash lines 90 and 91 respectively.

As shown in Fig. 3, if preferred, the unit 41 may be placed in a separate boiler 92 having an inlet pipe and outlet pipe 93 and 94 respectively extending to a secondary radiator 95 located within the hot air duct 23. Thereby there is no danger of exhaust gases leaking into the hot air duct carrying heated air to the room or point of use. The same boiler may have a by-pass pipe 96 in order to furnish domestic or like hot water in the building.

The various degrees of heat are given merely to describe the present invention and may be varied according to individual requirements. Other variations and modifications may be made within the scope of this invention.

What I claim is:—

1. In an apparatus of the class described the combination of a hot air duct; a cold air duct; an internal combustion engine having a water jacket and an exhaust; a generator operated by said engine; an exhaust heated radiator in said hot air duct, connected to said engine exhaust; a water jacket heated radiator in said hot air duct, connected to said engine water jacket; an outlet duct common to said hot and cold air ducts; and means in said outlet duct operated by current from said generator adapted to control passage of air from both the hot and cold air ducts relatively to the outlet duct.

2. In an apparatus of the class described the combination of a hot air duct; a cold air duct; an internal combustion engine having a water jacket and an exhaust; an exhaust heated radiator in said hot air duct, connected to said engine exhaust; a water jacket heated radiator in said hot air duct, connected to said engine water jacket; an outlet duct common to said hot and cold air ducts; and means in said outlet duct adapted to control passage of air from both the hot and cold air ducts relatively to the outlet duct.

3. In an apparatus of the class described the combination of a hot air duct; a cold air duct; an internal combustion engine having a water jacket and an exhaust; a generator operated by said engine, to provide electric current; an exhaust heated radiator in said hot air duct, connected to said engine exhaust; a water jacket heated radiator in said hot air duct, connected to said engine water jacket; an outlet duct common to said hot and cold air ducts; a by-pass duct associated with said hot air duct; and means operated by said generator adapted to control passage of air from both the hot and cold air ducts relatively to the outlet duct and to simultaneously control the by-pass duct.

4. In an apparatus of the class described the combination of a hot air duct; a cold air duct; an internal combustion engine having a water jacket and an exhaust; an exhaust heated radiator in said hot air duct, connected to said engine exhaust; a water jacket heated radiator in said hot air duct, connected to said engine water jacket; an outlet duct common to said hot and cold air ducts; a by-pass duct associated with said hot air duct; and means adapted to control passage of air from both the hot and cold air ducts relatively to the outlet duct and to simultaneously control the by-pass duct.

5. In an apparatus of the class described the combination of a hot air duct; a cold air duct; an internal combustion engine having a water jacket and an exhaust; an exhaust heated radiator in said hot air duct, connected to said engine exhaust; a water jacket heated radiator in said hot air duct, connected to said engine water jacket; a generator driven by said engine; a current consuming heating element in circuit with the generator and disposed within the hot air duct; an outlet duct common to said hot and cold air ducts; and means operated by said generator in said outlet duct adapted to control passage of air from both the hot and cold air ducts relatively to the outlet duct.

6. In an apparatus of the class described the combination of a hot air duct; a cold air duct; an internal combustion engine having a water jacket and an exhaust; an exhaust heated radiator in said hot air duct, connected to said engine exhaust; a water jacket heated radiator in said hot air duct, connected to said engine water jacket; a generator driven by said engine; a current consuming heating element in circuit with the generator and disposed within the hot air duct; an outlet duct common to said hot and cold air ducts; and means in said outlet duct adapted to control passage of air from both the hot and cold air ducts relatively to the outlet duct.

7. In an apparatus of the class described the combination of a hot air duct; a cold air duct; an internal combustion engine having a water jacket and an exhaust; an exhaust heated radiator in said hot air duct, connected to said engine exhaust; a water jacket heated radiator in said hot air duct, connected to said engine water jacket; a generator driven by said engine; a current consuming heating element in circuit with the generator and disposed within the hot air duct; an outlet duct common to said hot and cold air ducts; a by-pass duct associated with said hot air duct; and means operated by said generator adapted to control passage of air from both the hot and cold air ducts relatively to the outlet duct, and to simultaneously control the by-pass duct.

8. In an apparatus of the class described the combination of a hot air duct; a cold air duct; an internal combustion engine having a water jacket and an exhaust; an exhaust heated radiator in said hot air duct, connected to said engine exhaust; a water jacket heated radiator in said hot air duct, connected to said engine water heater; a generator driven by said engine; a current consuming heating element in circuit with the generator and disposed within the hot air duct; an outlet duct common to said hot and cold air ducts; a by-pass duct associated with said hot air duct; and means adapted to control passage of air from both the hot and cold air ducts relatively to the outlet duct, and to simultaneously control the by-pass duct.

9. In an air conditioning and distributing apparatus the combination of a hot air duct; a cold air duct; an internal combustion engine having a water jacket and an exhaust; a generator operated by said engine; an exhaust heated radiator in said hot air duct, connected to said engine exhaust; a water jacket heated radiator in said hot air duct, connected to said engine water jacket; a generator heated resistance unit in said hot air duct; a filter in at least one of said ducts; a humidifier in said hot air duct; a humidistat adapted to automatically control said humidifier; cooling means in said cold air duct; and thermostatically controlled means adapted to automatically control the passage of air through said ducts.

10. In an air conditioning and distributing apparatus the combination of a hot air duct; a cold air duct; an internal combustion engine having a water jacket and an exhaust; a generator operated by said engine; an exhaust heated radiator in said hot air duct, connected to said engine exhaust; a water jacket heated radiator in said hot air duct, connected to said engine water jacket; a generator heated resistance unit in said hot air duct; impelling means for forcing air through said hot and cold air ducts; a filter in at least one of said ducts; a humidifier in said hot air duct; a humidistat adaped to automatically control said humidifier; cooling means in said cold air duct; and thermostatically controlled means adapted to automatically control the passage of air through said ducts and to control said impelling means.

11. In an apparatus of the class described the combination of a hot air duct; a cold air duct; an outlet duct common to said hot air and cold air ducts; a gate in said common outlet movable to selectively close said hot air duct and said cold air duct; a by-pass associated with said hot air duct; and a gate normally closing said by-pass and movable to open said by-pass upon movement of said first named gate to close said hot air duct.

12. In an apparatus of the class described the combination of a hot air duct; a cold air duct; an outlet duct common to said hot air and cold air ducts; a gate in said common outlet movable to selectively close said hot air duct and said cold air duct; a by-pass associated with said hot air duct; a gate normally closing said by-pass and movable to open said by-pass upon movement of said first named gate to close said hot air duct; and a thermostatically controlled reversible motor for movement of said first named gate.

13. In an apparatus of the class described, the combination of a hot air duct; a cold air duct; an inlet port for the cold air duct; an inlet port for the hot air duct; an outlet port for the cold air duct; an outlet port for the hot air duct; a gate movable to selectively close said hot and cold air inlet ports; a second gate movable to selectively close said hot and cold air outlet ports; and a thermostatically controlled means adapted to move said gates to concurrently close said hot air inlet and outlet ports and to concurrently close said cold air inlet and outlet ports.

14. In an apparatus of the class described, the combination of a hot air duct; a cold air duct; an inlet port for said hot air duct; an inlet port for said cold air duct; an outlet port for said hot air duct; an outlet port for said cold air duct; a gate movable to selectively close said hot air inlet port and said cold air inlet port; a gate movable to selectively close said hot air outlet port and said cold air outlet port; a by-pass associated with said hot air duct; a gate normally closing said by-pass and movable to an open position upon movement of said second named gate to close said hot air outlet port; and a thermostatically controlled means for concurrently moving said first and second named gates to close said hot air inlet and outlet ports and for concurrently moving said first and second named gates to close said cold air inlet and outlet ports.

JOHN R. JOHNSON.

CERTIFICATE OF CORRECTION.

Patent No. 2,096,967.  October 26, 1937.

JOHN R. JOHNSON.

It is hereby certified that error appears in the printed specification of the above numbered patent requiring correction as follows: Page 5, first column, line 26, claim 8, for the word "heater" read jacket; and that the said Letters Patent should be read with this correction therein that the same may conform to the record of the case in the Patent Office.

Signed and sealed this 25th day of January, A. D. 1938.

(Seal)

Henry Van Arsdale,
Acting Commissioner of Patents.